United States Patent
Howe

[15] 3,678,308
[45] July 18, 1972

[54] SCANNING DEVICE

[72] Inventor: Spencer D. Howe, Los Angeles, Calif.

[73] Assignee: Hughes Aircraft Company, Culver City, Calif.

[22] Filed: May 27, 1970

[21] Appl. No.: 40,837

[52] U.S. Cl. .............................................. 310/36, 318/119
[51] Int. Cl. ................................. B61f 17/00, F16c 1/24
[58] Field of Search ............... 310/36, 37; 178/7.6; 250/230; 350/6, 99; 318/129–131, 119, 123; 58/23

[56] References Cited

UNITED STATES PATENTS

| | | | |
|---|---|---|---|
| 2,895,095 | 7/1959 | Guyton | 310/36 X |
| 3,221,191 | 11/1965 | Cuches et al. | 310/36 |
| 3,343,012 | 9/1967 | Scott | 310/36 |
| 3,020,414 | 2/1962 | McKnight et al. | 250/230 X |
| 3,532,408 | 10/1970 | Dostal | 350/6 |
| 3,436,139 | 4/1969 | Barkow | 178/7.6 X |
| 3,437,394 | 4/1969 | Hatcher et al. | 178/7.6 X |
| 3,042,817 | 7/1962 | Mohr | 310/38 |
| 3,155,855 | 11/1964 | Futterer | 310/38 |

Primary Examiner—Lewis H. Myers
Assistant Examiner—U. Weldon
Attorney—James K. Haskell and Lewis B. Sternfels

[57] ABSTRACT

A mirror is oscillated through an angular arc defined by arc terminal points. Springs absorb the kinetic energy of halt at the terminal points, the springs returning the energy to the mirror thereby reversing the direction of oscillation thereof. Magnetic means coupled to the mirror provides a source of force to induce oscillation of the mirror and to bias the mirror to a position off the center point of the arc of oscillation when operative. The magnetic means is so driven by a square wave signal, having twice the frequency of oscillation, to create an intermittent force on the mirror that one portion of the square wave force aids movement of the mirror from its center point of oscillation towards one of the terminal points and another portion of the square wave force acts against movement (and spring energy) of the mirror from the terminal point towards the center point. Too slow or too fast movement of the mirror is compensated for by the square wave force. The mirror therefore moves at a substantially constant angular velocity between the terminal points.

10 Claims, 10 Drawing Figures

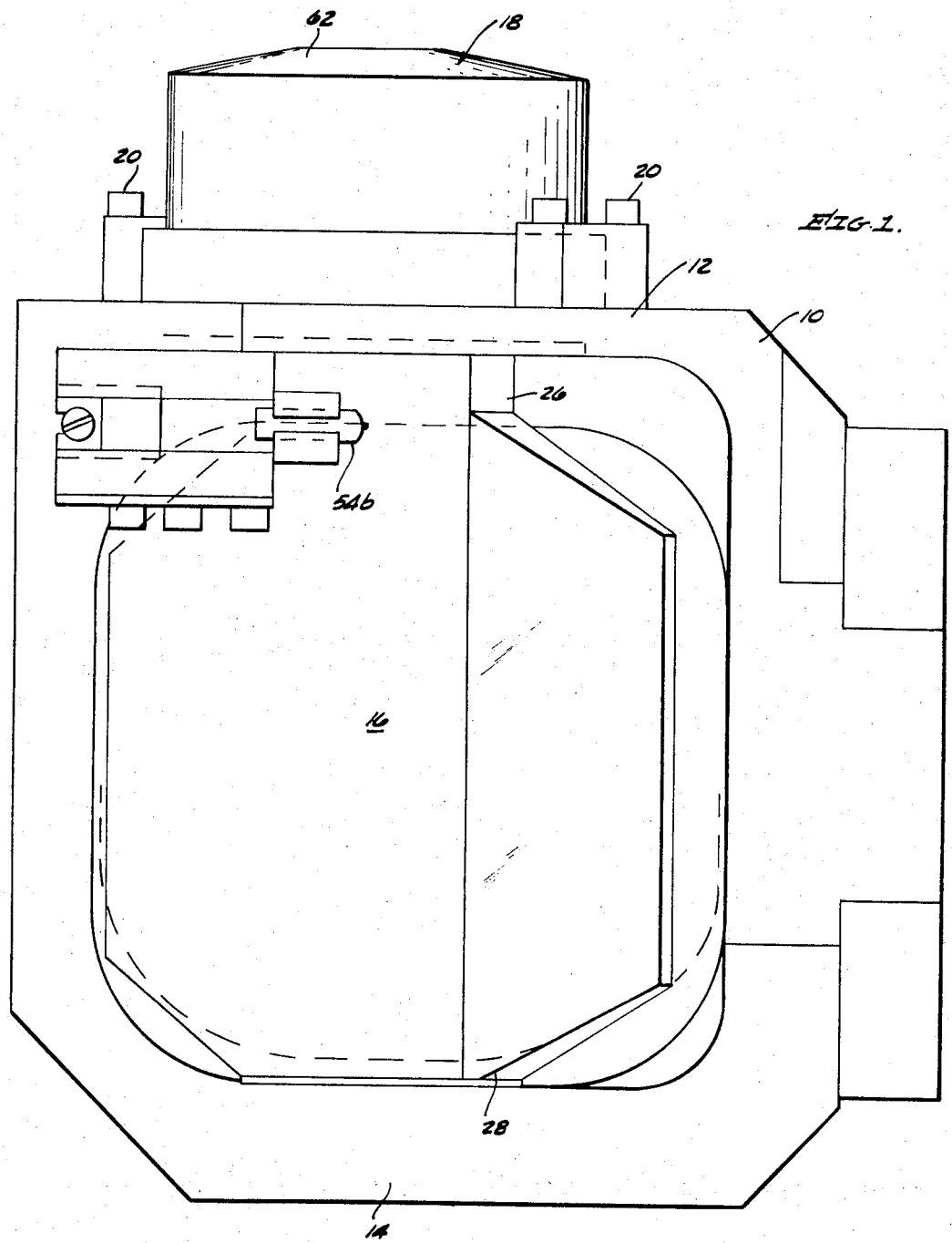

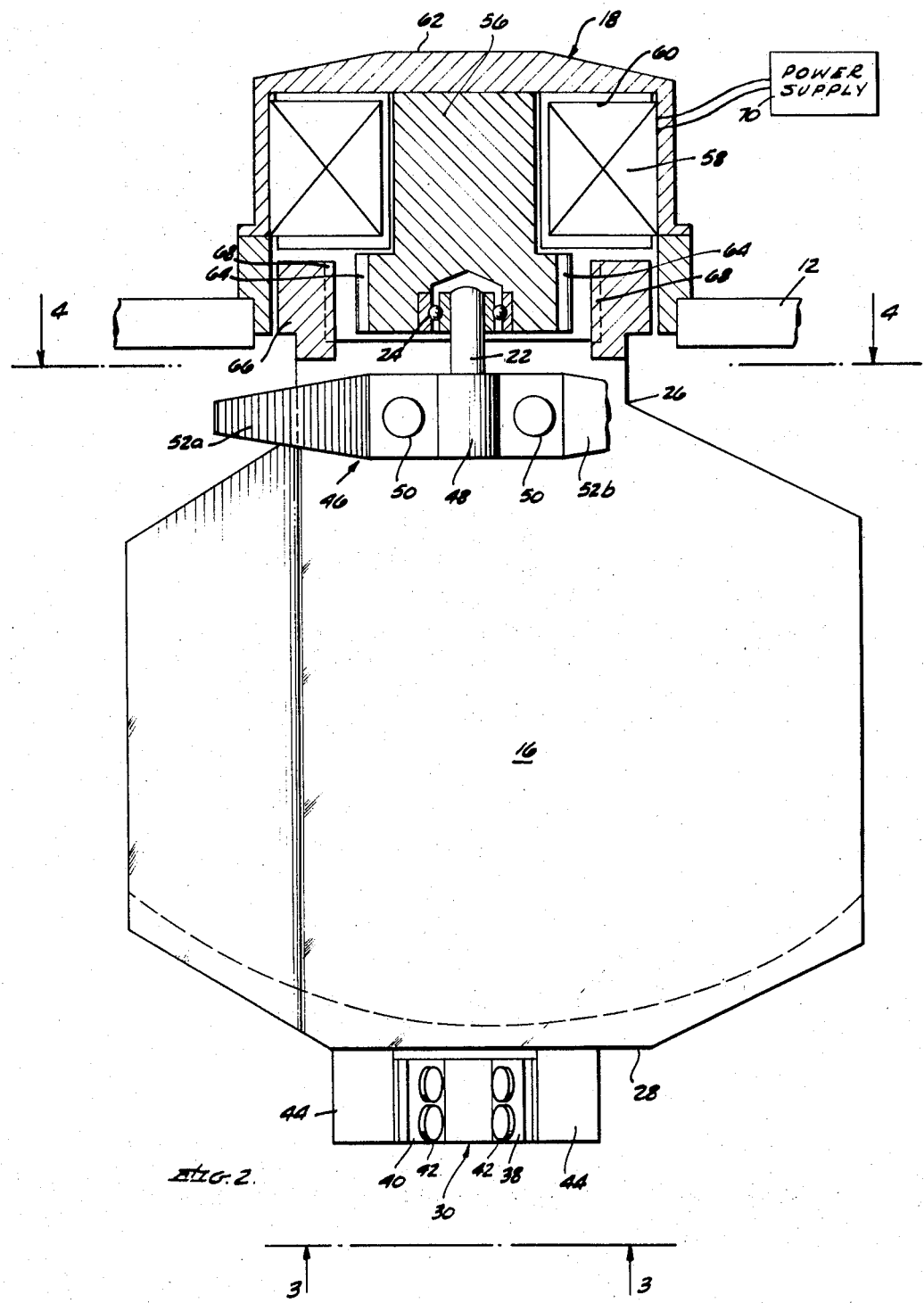

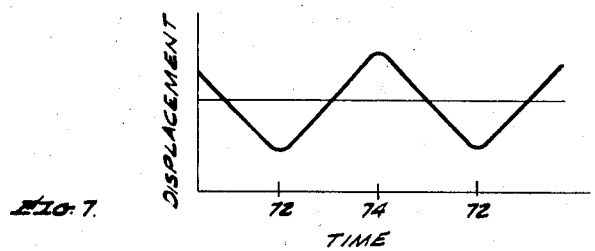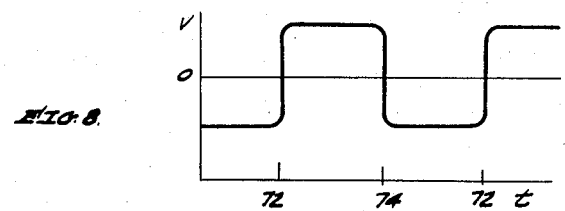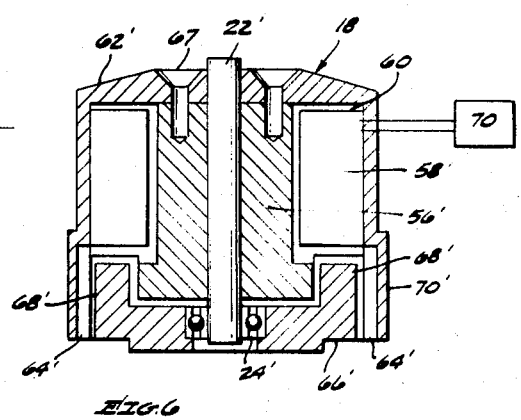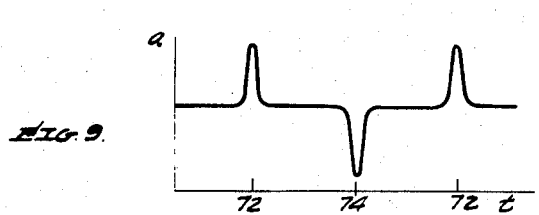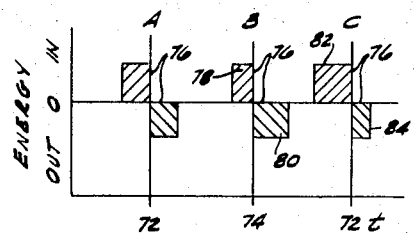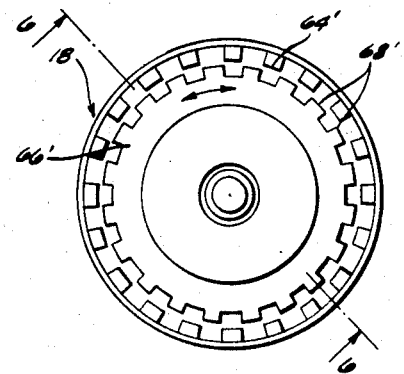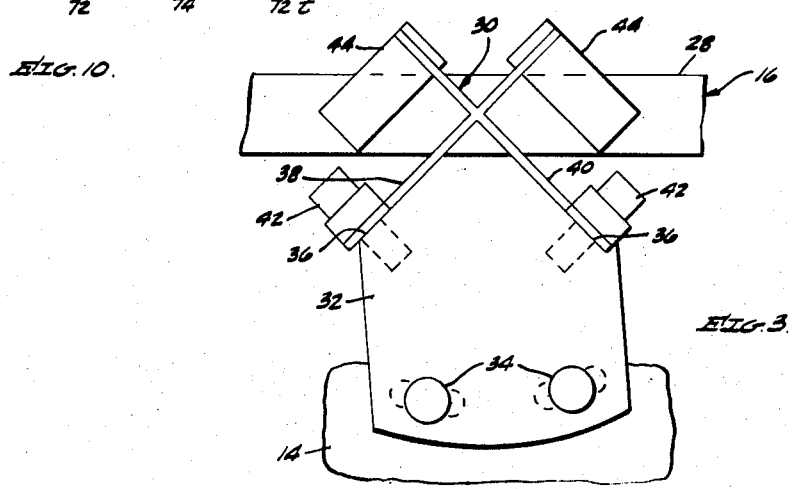

SCANNING DEVICE

The invention herein described was made in the course of or under a contract or subcontract thereunder, with the Department of the Army.

The present invention relates to an arrangement for oscillating an element, such as a reflecting surface, back and forth in an arcuate path at a substantially constant angular velocity through a major arc segment. It constitutes an improvement over the invention described in copending patent application, Ser. No. 766,699, filed Oct. 11, 1968, by Spencer G. Howe, the inventor and assignee thereof, and which is assigned to the same assignee of the present application.

The device of the aforementioned patent application, Ser. No. 766,699, describes a means of oscillating an element in limit-cycle between stiff springs at the terminal points of the arc through which the element oscillates. The springs serve also as electrical contacts through which the driving coil or coils of electromagnetic means are excited. The making of a contact at one terminal point excites the coil which is so arranged as to drive the element towards the other terminal point. The magnetic means, when energized, defines the center point of the arc; therefore, either a special spring or permanent magnet mechanism is required to bias the element to one of the terminal points.

If the movement of the element of the aforementioned device were not synchronized precisely with the amount of energy stored in the springs and with the electromagnetic force aroused, the element would not move with regularity. When the element moves too slowly, it receives increased energy and speeds up. When the element moves too quickly, there would be excess energy which could only be dissipated by means of the damping created by interaction of the element with air. Since the damping does not dissipate the excess energy immediately, the irregular element motion would continue for several cycles and cause continued undesired operation of the device.

The present invention overcomes this and other problems by utilizing the springs of the aforementioned device simply as a source of mechanical energy with no electrical function and by driving a modified magnetic means by an external electrical signal having, for example, an off-on square wave at twice the desired scan frequency of the element. When the element moves away from the central point of the arc through which it oscillates and towards the arc terminal point, the magnetic means drives the element in the same direction, thus accelerating the element and increasing its momentum. After rebounding from the arc terminal point, the element moves towards the arc center point but now against the driving force of the magnetic means, thus decelerating the element and decreasing or reducing its momentum. This operation is the same regardless of whether the element's movement is as desired or too slow or too fast.

In the first case, one half of the magnetic drive is in the direction of movement of the element from the center point to the terminal point and one half the magnetic drive is in the opposite direction of movement of the element from the terminal point towards the center point, at which time the kinetic energy of the element acts against the half portion of the magnetic drive. Thus, both portions of the magnetic drive are balanced. For too fast and too slow movements of the element, proportionate amounts of the magnetic drive respectively are either dissipated to slow the element or utilized to increase the speed of the element. As a consequence, the element is controlled to oscillate between the terminal points with substantially uniform velocity.

Accordingly, it is an object of the present invention to provide an arrangement wherein an element can be oscillated back and forth at a substantially constant angular rate.

A more particular object of the invention is to provide controlling means to drive an oscillating element at a substantially constant velocity through a major segment of its oscillating arc.

A further object of the invention is to provide a mode of oscillating an element through a determined arc at a relatively constant velocity through a major segment of that arc by means of a controlling external signal.

Other aims and objects as well as a more complete understanding of the present invention will appear from the following explanation of exemplary embodiments and the accompanying drawings thereof, in which:

FIG. 1 is a side elevational view of a typical embodiment of the invention;

FIG. 2 is an elevational view of the structure shown in FIG. 1, partially fragmented, to illustrate certain internal construction details of one design of the magnetic driver;

FIG. 3 is a fragmentary sectional view taken along lines 3—3 of FIG. 2 and illustrating a flexural pivot arrangement for the oscillating member;

FIG. 5 is a sectional view of a second design of the magnetic driver similar to that depicted in FIG. 2;

FIG. 6 is a vertical sectional view of the driver taken along lines 6—6 of FIG. 5;

FIG. 7 is a time-displacement curve of the moving oscillating element;

FIG. 8 is a time-velocity curve of the moving element;

FIG. 9 is a time-acceleration curve for the moving element as a plot of torque versus time; and FIG. 10 is a curve depicting the cycle of oscillation of the element superimposed over excitation of the magnetic driver.

Figure 4:
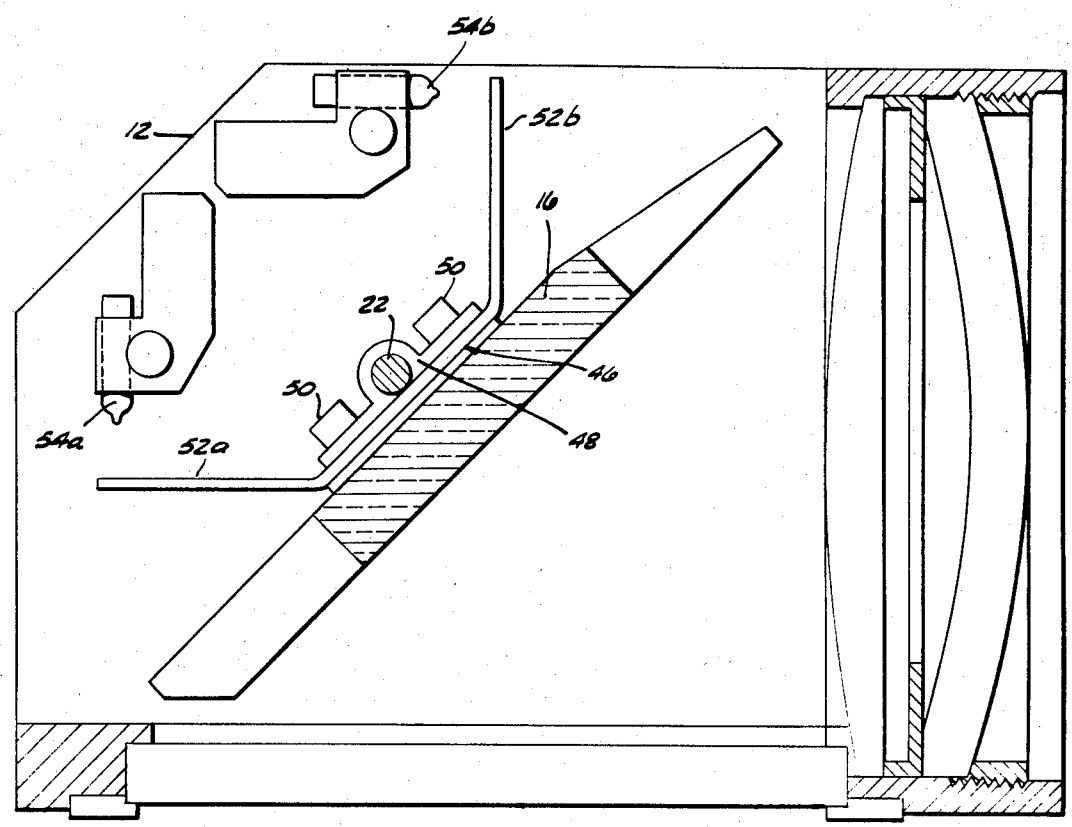
FIG. 4 is a fragmentary sectional view taken along lines 4—4 of FIG. 2 and illustrating the mirror structure and spring arrangement.

Referring to FIGS. 1-4, a frame 10 is provided with generally parallel spaced support plates 12 and 14. Interposed between the plates is a mirror or reflecting element 16 which is mounted for oscillatory movement as will become apparent in the subsequent structural recitation taken in conjunction with FIGS. 2 and 3. A magnetic driver 18 is supported in any conventional manner as by cap screws 20 to the upper plate 12 of the frame 10.

As shown in FIG. 2, mirror 16 has an upwardly projecting shaft 22 secured thereto. The shaft is received in bearings 24 in driver 18 for oscillatory movements of mirror 16 at one end 26 thereof.

The other end 28 of the mirror (see FIG. 3) is supported by a flexure pivot 30. Pivot 30 is secured between the mirror and a block 32 affixed to lower plate 14 by a pair of cap screws 34. Block 32 provides a pair of mounting surfaces 36 to which are respectively secured flexure elements 38 and 40 by appropriate cap screws 42. Flexure elements 38 and 40 have their opposed ends captively received in spring support clamps 44, which are fixedly secured to one end of mirror 16 in any conventional manner, such as by welding or brazing. The flexure pivot is so mounted that there is no stress in elements 38 and 40 when the mirror is in its neutral or dead center position in its arc of oscillating travel, thus assuring centering of the mirror.

As shown in FIGS. 2 and 4, mirror element 16 has secured thereto, at its other end 26, a spring member indicated generally at 46. Member 46 has a central segment thereof 48 secured to end 26 of mirror 16 as by cap screws 50. Opposed ends of element 46 are mounted in a cantilever manner to provide arms 52a and 52b and act in the capacity of cantilever springs during the action hereinafter described. Plate 12 has secured to the underside thereof adjustable abutments or arc terminal ends 54a and 54b, each being respectively contactable with cantilever arms 52a and 52b of element 46. Thus, alternate engagement between arms 52a and 52b and abutments 54a and 54b at the respective ends of elements 46 define the termination points of the arc of movement of mirror 16 in opposed directions and their physical engagements provide a force storing effect for arms 52a and 52b, the release of which aids in the return movement of mirror 16.

Although the invention to this point has been described as utilizing flexure pivot 30 and arms 52a and 52b, both act in the same manner and it is not necessary that both be used; however, abutments are still required. Only one of the two bias means is required for the operation of the invention, as will be presently described.

The mode of inducing mirror oscillation is described with respect to FIGS. 2, 4, 5, and 6. In FIG. 2, relating to one embodiment of magnetic driver 18, the driver contains a solid stationary magnetic core 56 which is centrally located about a coil 58. A nylon insulator 60 electrically insulates coil 58 from the housing 62 of driver 18 and core 56. The core is secured to the housing by any convenient means. The external peripheral portion of core 56 is notched like gear teeth to provide outwardly directed bosses 64. Mirror 16, in turn, is provided with an extension 66 having inwardly directed bosses 68, which are shaped like internal gear teeth and spaced from bosses 64 on the core.

An alternate arrangement of driver 18 is depicted in FIGS. 5 and 6 and includes a solid stationary magnetic core 56'. Supported internally of core 56' is a shaft 22' which extends beyond one core end towards the mirror. Bearings 24' are mounted about the shaft extension to journal a mirror extension 66'. A plurality of outwardly directed gear teeth shaped bosses 68' on extension 66' are concentrically aligned, but spaced from, a plurality of inwardly directed gear teeth shaped bosses 64' of a portion 70' of housing 62'.

In both embodiments bosses 64 and 68 and bosses 64' and 68' are peripherally spaced from one another when mirror 16 is at its central arc position and flexure pivot 30 is unstressed. In addition, both extensions 66 and 66' act as rotors. Energization of coils 58 and 58' is from a source 70 which preferably supplies a square wave signal.

Upon energization of either coil 58 or 58', their respective cores are energized and create a magnetic force which causes extension 66 and 66' and associated mirror 16 to be biased and to move in an arcuate path because the magnetic flux path through bosses 64 or 64' tends to travel along the shortest path which exists through peripherally spaced bosses 68 or 68'.

Alternatively, driver 18 may comprise a pair of coils placed preferably on the frame and positioned in such a manner that one coil drives the element in one direction while the other coil drives the element in the opposite direction. The power supplied to the coils is so timed as to provide energy pulses at the ends of oscillation.

The motion of mirror 16 causes one of the spring arms such as arm 52a (see FIG. 4) to contact one of the terminal ends or abutments, such as abutment 54a, to store energy in the contacting spring arm and also in flexure pivot 30 (see FIG. 3). The stored spring energy pivots the mirror against the magnetic force aroused by magnetic driver 18 until the central point of the arc of oscillation is crossed. By this time, the signal to the driver has switched off and again resumed so that the magnetic force aids movement of the mirror towards abutment 54b at which point energy is stored in contacting spring arm 52b and the flexure pivot. Oscillation of mirror 16 continues so long as an electric signal is furnished coil 58 or 58'.

Attention is now directed to FIGS. 7–10 which respectively illustrate, for the disclosed oscillating device, the time displacement curve, the velocity in relation to time curve, the acceleration of the oscillating element in relation to time curve, and the correspondence between driver energy and mirror movement. It is desirable that the acceleration and/or deceleration of the oscillating mirror or element as it reaches the terminal points of its oscillating arc be extremely short in relation to time and that a relatively uniform velocity throughout a major portion of the arc of motion be effectively achieved for the purpose of maximizing the useful portions of each scan. As noted above, this result is extremely desirable in many types of scanning systems currently being used in today's art. It is, of course, recognized that an oscillating device having an absolutely constant velocity scan is for all practical purposes impossible to fabricate. However, the present invention has been found to have an increased usable portion of each scan by reason of each scan having a larger portion characterized by uniform or constant velocity.

In FIGS. 7–10, the termini of the oscillating cycle, terminating at abutments 54a and 54b (see FIG. 4), are shown as points 72 and 74 on the respective curves, which curves are to be understood as being illustrative of the operation of the present invention rather than as being exact representations thereof. The energy of the magnetic driver, as obtained from a square wave signal, is shown in FIG. 10 as shaded portions 76, the portions above the zero (0) energy line representing the force derived from the energy aiding movement of the mirror from the arc center point towards a terminal end and the portions below the zero (o) energy line representing the magnetic energy force resisting movement of the mirror from the arc terminal end towards the center point. Thus, during the above zero line portion, energy is placed into the system and during the below zero line portion, energy is taken out of the system through the slowing of the mirror.

Theoretically, the two portions are equal, indicating that the mirror moves with absolute constant velocity, as represented by wave portion A of FIG. 10. However, this theoretical operation is not possible because of friction, energy unbalances, imperfections in the materials of the system, etc. Therefore, in practice, the mirror generally moves slightly too fast or too slow.

If movement is too fast, the mirror rebounds from a terminal abutment 54a at a time earlier than that desired, as shown by curve B of FIG. 10 and as illustrated by a lesser above zero line portion 78 than a negative portion 80. Upon rebounding from abutment 54a, the mirror movement is against the force exerted by the magnetic driver to the extent of the energy contained in negative portion 80. Thus, the mirror movement is slowed to more nearly that of the desired velocity.

Assuming that the mirror is now slowed to too great an extent, the mirror will reach and rebound from terminal abutment 54b at a time later than desired, as shown by curve C of FIG. 10. However, under this circumstance above zero line portion 82 is greater than below zero line portion 84, thus causing the mirror movement to increase speed towards that of the desired velocity.

Consequently, the present invention conserves magnetic force energy and utilizes this energy to positively bring the movement of mirror 16 as close to its desired velocity as possible. In addition, because bosses 68 or 68' of rotor 66 or 66' are peripherally displaced from bosses 64 or 64' of stator 56 or 56', the mirror can be started up from rest without the need for any special biasing mechanism other than the magnetic driver.

Source 70 has been described as generating a square wave signal; however, any other suitable signal may be employed for the purpose of the present invention.

Although the invention has been described with reference to particular embodiments thereof, it should be realized that various changes and modifications may be made therein without departing from the spirit and scope of the invention.

What is claimed is:

1. A scanning device comprising:
   a mirror moveable through an arc of oscillation bounded by arc terminal points about an axis of oscillation, said mirror having a pair of support ends on the axis of oscillation;
   a stationary frame having journal means pivotally supporting said mirror at one of said support ends and a flexure pivot supporting said mirror at the other of said support ends, said flexure pivot being unstressed when said mirror is at the center point of the arc to center said mirror between the arc terminal points,
   a pair of abutments secured to said frame and positioned orthogonally to and on opposite sides of the axis of oscillation,
   a spring member having a pair of cantilever arms of spring material secured to said mirror and positioned orthogonally to and on opposite sides of the axis of oscillation, said arms having portions thereon contactable with said frame abutments at the arc terminal points and capable of storing energy when stressed;

a magnetic driver secured between said frame and said mirror at said journal means, said driver comprising an electromagnet secured to said frame and having a plurality of radially extending bosses evenly distributed in a radial manner about the axis of oscillation and a rotor of magnetic material secured to said mirror and having a plurality of radially extending bosses evenly distributed in a radial manner about the axis of oscillation, said electromagnet bosses and said rotor bosses being alternately spaced in a peripheral manner from one another and a source of electrical energy coupled to said electromagnet for supplying a square wave signal thereto;

said mirror oscillable in response to supply of the square wave signal to said electromagnet and to rebounding of said mirror between said abutments upon contact therewith of said spring member cantilever arms.

2. An oscillating device comprising an element journalled to a frame and moveable at a substantially constant velocity about an axis in an arc of oscillation bounded by arc terminal points, means on said frame defining the arc terminal points, a force producing means external to said element including means for generating an input signal, coupled between said element and said frame and coupled to said signal generation means for actuation upon receipt of the input signal to induce oscillation of said element relative to said frame at the substantially constant velocity, and resilient means secured to said element and coupling said element and said frame at the arc terminal points and acting in conjunction with said force producing means upon the actuation thereof for oscillating said element at substantially constant angular velocity and at a frequency determined only by the input signal to said force-producing means.

3. A device as in claim 2 further including element positioning means coupled between said element and said frame for positioning said element at a desired position when said force producing means is inoperative, said force producing means being further operable to initiate motion of said element from the desired position.

4. A device as in claim 3 wherein said element positioning means comprises a cross-axis flexure pivot.

5. A device as in claim 2 wherein said resilient means comprises a spring member contactable with said said frame.

6. A device as in claim 2 wherein said input signal generating means includes impulse generating means for obtaining alternate acceleration and deceleration of the movement of said element during the oscillation thereof.

7. A device as in claim 9 wherein said resilient means includes means for moving said element in a cycle having a direction of oscillation, and said alternating means includes means operable on said element to reinforce said resilient means in the direction of oscillation during a portion of the cycle and to oppose said resilient means in a direction opposite to the direction of oscillation during another portion of the cycle to obtain the alternate acceleration and deceleration.

8. An oscillating device comprising an element journalled to a frame for movement about an axis in an arc of oscillation, an external force producing means comprising an electromagnetic driver having a stator secured to said frame and a rotor secured to said element and including means coupled to said driver for actuation thereof, said driver being operable upon actuation thereof to induce oscillation of said element relative to said frame, and bias means coupled between said element and said frame only during the movement at the ends of the arc of oscillation and acting in conjunction with said force producing means upon the actuation thereof for causing oscillation of said element at substantially constant angular velocity.

9. A device as in claim 6 wherein said stator and said rotor are each provided with bosses radially extending about the axis of oscillation and relatively moveable in response to the existence of magnetic flux.

10. A device as in claim 7 wherein said stator bosses are peripherally spaced from said rotor bosses to initiate the movement of said element.

* * * * *